S. J. T. LONG.
HEAT SAVING DEVICE FOR GAS STOVES.
APPLICATION FILED AUG. 28, 1918.

1,366,738.

Patented Jan. 25, 1921.

INVENTOR:
S. J. T. LONG.
BY: H. van Osdenmal
ATTORNEY.

UNITED STATES PATENT OFFICE.

SIDNEY JAMES THOMAS LONG, OF AUCKLAND, NEW ZEALAND.

HEAT-SAVING DEVICE FOR GAS-STOVES.

1,366,738.  Specification of Letters Patent.  Patented Jan. 25, 1921.

Application filed August 28, 1918. Serial No. 251,853.

*To all whom it may concern:*

Be it known that I, SIDNEY JAMES THOMAS LONG, subject of the King of Great Britain, residing at Croydon Road, Mount Eden, Auckland, in the Dominion of New Zealand, have invented a new and useful Heat-Saving Device for Gas-Stoves; and I do hereby declare the following to be a full, clear and exact description of the same.

This invention has been devised in order to provide for the utilization of the waste heat from a gas ring or other heating agency employed in heating one utensil in order to heat one or more other utensils. The invention is particularly adaptable for use on gas stoves or in conjunction with gas rings to provide for the simultaneous heating of two or more utensils by the heat from one burner and thus to save the extra gas that would be needed to heat such utensil separately.

The invention consists in an improved construction of that known class of appliances in which the device is formed having a plate top shaped to extend on two different levels and formed with a pot opening in the lower level, and with one or more openings in the upper level. This device is adapted to rest above the burner of a stove so that the heat thereof extends upward upon a cooking vessel set over such opening and the waste heat is then diverted upward to the opening or openings in the higher levels.

In the present invention the device designed for this purpose consists in a metal plate arranged on inclosed sides and ends, and having one of its ends at a lower elevation than the other. This lower end is formed with a pot opening in it so that when arranged over a burner, the flame thereof may rise directly on to a cooking utensil placed over such opening. The raised end of the plate is also made with one or more pot openings and beneath such openings is an upwardly inclined deflector plate that rises from the level of the bottom of the device at a point near the first mentioned pot opening so that the excess heat from the burner will be carried up to the raised pot opening or openings to heat a utensil or utensils placed over it or them. In cases where two or more subsidiary openings are provided, dampers may be provided to control the proportion of heat directed to each opening or to concentrate it on one opening, as may be required.

In the accompanying drawings:—

Figure 1:
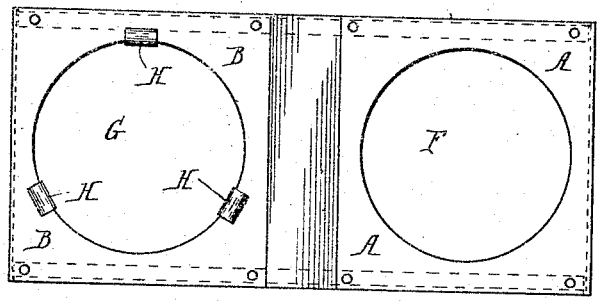
Figure 1 is a plan of the device as constructed for the simultaneous heating of two utensils.
Figure 2:
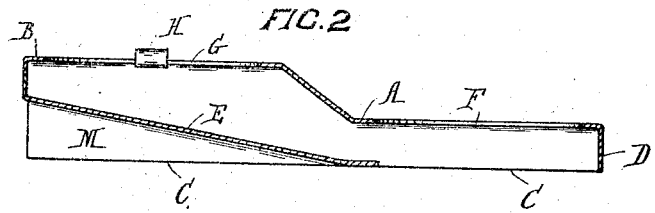
Fig. 2 is a longitudinal sectional elevation thereof.
Figure 3:
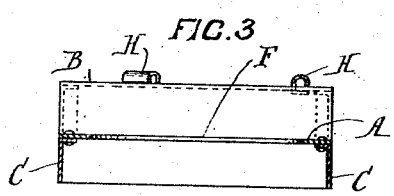
Fig. 3 is a cross section of the device, no damper being shown.

The device as constructed in the manner shown in the drawings, is formed by a top plate formed with one end A at a lower elevation than the other end B but both lying in parallel horizontal planes. This plate is secured upon the side pieces C shaped to support the plate at the necessary elevation and extending throughout its entire length, while the plate at its lower end is turned down, as at D to close the space beneath it, and at its upper end is bent down and then under and continued, at a downward incline, to a point beneath the lower portion A of the plate, and thereby to close that end of the device and to form the deflector E. The portion A is formed with the pot opening F therein while the portion B is formed with the pot opening G therein. Or its width may be increased as shown in Fig. 4 and formed with the two openings G therein arranged side by side.

It will be seen that when the device is arranged over a gas burner so that the flame thereof will act directly on a utensil placed over the opening F, the waste heat may then only pass up between the deflector E and the plate so that it will be directed out through the opening G and may be utilized to heat a utensil or utensils placed over such opening or openings. To insure a proper up-draft through this opening the edge of the opening is furnished with raised supports H at intervals around it, and which serve to provide escape vents beneath the utensil placed above the opening.

Figure 4:
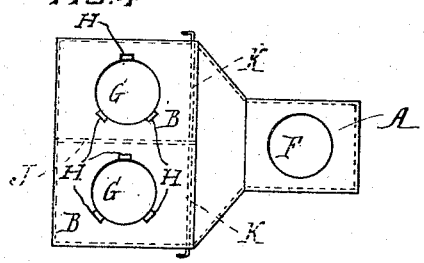
Fig. 4 is a plan, on a reduced scale, of the device constructed with three pot openings.

In the arrangement illustrated in Fig. 4, the respective openings G are divided off from one another by a baffle plate J extending longitudinally between them and serving to form separate channels leading to the respective openings. The inner end of each of such channels is then furnished with a damper K which may be used to close or partially close the passage of heat to such channel.

The space M beneath the deflector plate E may be used as a plate warming chamber.

I claim:—

1. A heat-conserving device for gas stoves, comprising a plate having two horizontal portions thereof in different planes, the sides and ends of said plate extending downwardly, said sides adapted to support said device and having their lower edges entirely in one horizontal plane, said horizontal portions formed with pot openings, a reflector plate arranged beneath the entire upper horizontal portion and beneath a part of the lower horizontal portion, said reflector plate extending across between the downwardly turned side plates and inclining upwardly from beneath the lower portion of the plate to the downwardly turned upper end, and upwardly projecting supports placed at intervals around the edge of the pot opening in the upper portion of the plate, said supports serving to provide escape vents beneath a utensil placed above said openings.

2. A heat conserving device for gas stoves comprising a plate having two horizontal portions thereof in different planes, the sides and ends of said plate extending downwardly, said sides adapted to support said device and having their lower edges entirely in one horizontal plane, said horizontal portions provided with pot openings, a reflector plate arranged beneath the entire upper horizontal portion of the plate and beneath a part of the lower portion, said reflector plate extending across between the downwardly turned side plates and inclining from beneath the lower portion of the plate to the downwardly turned upper end, baffle plates extending longitudinally between the openings in the upper portion of the plate and serving to form separate channels leading to the respective openings, and a damper at the inner end of each of said channels adapted to regulate and shut off the passage of heat to the channels.

In testimony whereof, I have signed this specification in the presence of two subscribing witnesses.

SIDNEY JAMES THOMAS LONG.

Witnesses:
EDW. BREVLEE HEWITT,
ETHEL FRANCES COURTNEY.